United States Patent
Rudolfi et al.

(10) Patent No.: US 11,358,454 B2
(45) Date of Patent: Jun. 14, 2022

(54) LOCKING DEVICE HAVING A LOCKING HOOK AND A SLIDE MOVABLE ON A LOCKING SUPPORT

(71) Applicant: Webasto SE, Stockdorf (DE)

(72) Inventors: Christian Rudolfi, Stockdorf (DE);
Franz Haberl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 626 days.

(21) Appl. No.: 15/944,292

(22) Filed: Apr. 3, 2018

(65) Prior Publication Data

US 2018/0297458 A1  Oct. 18, 2018

(30) Foreign Application Priority Data

Apr. 12, 2017  (EM) .............................. 17 166 249.7

(51) Int. Cl.
| | |
|---|---|
| *B60J 7/185* | (2006.01) |
| *E05C 5/00* | (2006.01) |
| *F16H 19/00* | (2006.01) |
| *F16H 21/54* | (2006.01) |

(52) U.S. Cl.
CPC .............. *B60J 7/1851* (2013.01); *E05C 5/00* (2013.01); *F16H 19/001* (2013.01); *F16H 21/54* (2013.01); *E05Y 2201/404* (2013.01); *E05Y 2900/542* (2013.01)

(58) Field of Classification Search
CPC ........ B60J 7/1851; B60J 7/196; B60J 7/1856; B60J 7/194; Y10S 292/05; E05C 5/00; F16H 19/001; F16H 21/54; E05Y 2201/404; E05Y 2900/542
See application file for complete search history.

(56) References Cited

U.S. PATENT DOCUMENTS

| | | | |
|---|---|---|---|
| 5,284,378 A | 2/1994 | Sautter | |
| 10,291,847 B2* | 5/2019 | Chin | ........................ H04N 5/77 |
| 10,618,393 B2* | 4/2020 | Matsumoto | ................ B60J 7/08 |

(Continued)

FOREIGN PATENT DOCUMENTS

| | | |
|---|---|---|
| AT | 406661 B | 7/2000 |
| DE | 69302584 T2 | 9/1996 |

(Continued)

*Primary Examiner* — Mark A Williams
(74) *Attorney, Agent, or Firm* — Fitch, Even, Tabin & Flannery, LLP

(57) ABSTRACT

A locking device for a top of a convertible vehicle is proposed, comprising a locking support (22), a locking hook (28), which can be shifted in a translational and rotational manner so as to be displaced between a release position and a locked position, and a driving mechanism for the locking hook (28), said driving mechanism comprising a driving motor (64) and driving a slide (36) movable on the locking support (22). The slide (36) is connected to a driving section of the locking hook (28) via a pull-link arrangement (46) in such a manner that the locking hook (28) undergoes a pivoting movement when the slide (36) is moved. The locking support (22) has an insert having a guiding track for a guiding element which is arranged on the pull-link arrangement (46) or on the locking hook (28), and the guiding track defines a pivot position of the locking hook (28) with respect to the locking support (22).

15 Claims, 22 Drawing Sheets

(56) References Cited

U.S. PATENT DOCUMENTS

| | | | |
|---|---|---|---|
| 2002/0021021 A1* | 2/2002 | Schutt | B60J 7/1851 |
| | | | 296/107.09 |
| 2002/0167194 A1* | 11/2002 | Gerhardus Mentink | ................ |
| | | | B60J 7/205 |
| | | | 296/107.01 |
| 2003/0146643 A1* | 8/2003 | Dietl | B60J 7/1851 |
| | | | 296/121 |
| 2008/0277975 A1* | 11/2008 | Biecker | B60J 7/198 |
| | | | 296/224 |
| 2009/0170453 A1* | 7/2009 | Walia | H03F 3/245 |
| | | | 455/127.1 |
| 2009/0179453 A1 | 7/2009 | Schumacher et al. | |
| 2011/0095560 A1* | 4/2011 | Schmitt | B60J 7/198 |
| | | | 296/107.08 |
| 2012/0086230 A1* | 4/2012 | Wilke | B60J 7/1851 |
| | | | 296/107.16 |
| 2012/0086231 A1* | 4/2012 | Wilke | B60J 7/1851 |
| | | | 296/121 |
| 2012/0086232 A1* | 4/2012 | Wilke | E05B 83/00 |
| | | | 296/121 |
| 2018/0015813 A1* | 1/2018 | Rudolfi | B60J 7/1851 |

FOREIGN PATENT DOCUMENTS

| | | |
|---|---|---|
| DE | 102008003880 A1 | 7/2009 |
| DE | 102010044702 A1 | 3/2012 |
| EP | 1529908 A2 | 5/2005 |
| WO | 2010/017771 A1 | 2/2010 |

* cited by examiner

LOCKING DEVICE HAVING A LOCKING HOOK AND A SLIDE MOVABLE ON A LOCKING SUPPORT

CROSS-REFERENCE TO RELATED APPLICATIONS

This application claims priority from European Patent Application Number EU 17 166 249.7, filed Apr. 12, 2017, which is hereby incorporated herein by reference in its entirety for all purposes.

FIELD

The invention relates to a locking device of a top of a convertible vehicle having the features of the preamble of claim 1 and to a top of a convertible vehicle having a locking device of this kind.

BACKGROUND

A locking device of the kind mentioned above is known from document DE 10 2010 044 702 A1 and serves to fix a rigid roof element, which can be a front bow of a folding top or a rigid roof segment of a retractable hard top (RHT), to the front cowl of the vehicle in question. Said locking device comprises a locking support, which serves as a casing and which can be connected to the rigid roof element. A locking hook is pivotable around a bearing journal movable in the locking support. The locking hook has a hook section that can be displaced between a lowered release position and a raised locked position, in which the hook section is engaged with a corresponding locking element formed at the front cowl. For displacing the locking hook, the locking device has a driving mechanism, by means of which the bearing journal can be moved in such a manner that a displacing movement is introduced into the locking hook. Via a link arrangement of the driving mechanism, the driving torque generated by a driving motor is transmitted to a crosshead, on which the bearing journal of the locking hook is mounted and which is movable in corresponding guiding tracks of the locking support. In this locking device, the position of the locking hook with respect to the locking support is not always unambiguously defined. In fact, the locking hook is movable in the transverse direction because it can be turned about a crosshead axis that extends in the vertical direction. Additionally, a magnet is used to retain the locking hook, said magnet pulling the locking hook against a sliding surface. Also, the driving mechanism has an elaborate design because the crosshead is connected to a driving link arrangement both at the top and at the bottom. This is disadvantageous in terms of height and weight and is also reflected in the production costs of the locking device. Furthermore, merely a pulling force extending between the bearing journal and the hook section can be generated in this locking device. A force component perpendicular to said direction cannot be generated.

The object of the invention is to provide a locking device of the kind mentioned above that has an optimized driving mechanism.

According to the invention, this object is attained by the locking device having the features of claim 1.

Therefore, according to the invention, it is proposed that the slide be connected to a driving end of the locking hook via a pull-link arrangement. The pull-link arrangement is thus arranged between the locking hook and the slide, allowing a torque to be introduced into the locking hook, said torque pushing the hook end upward during displacement from a release position into a closed position. The pull-link arrangement can also retain the locking hook in the transverse direction, the hook thus having no freedom of movement in the transverse direction of the vehicle. The slide, which is advantageously guided in a guiding rail of the locking support, has only one degree of freedom, which corresponds to the movement in the guiding rail.

In order to ensure that the locking hook always takes up a defined position with respect to the locking support, the locking support has a guiding track for a guiding element which is arranged on the pull-link arrangement or on the locking hook itself, the guiding track being arranged on an insert of the locking support. When the slide is moved in the locking support, the guiding element arranged on the pull-link arrangement will thus be moved in the guiding track of the locking support, the hook end of the locking hook thus being pulled upward from the release position into the locked position in a defined manner when the locking hook is being displaced. In a corresponding manner, the hook end of the locking hook will be pushed downward from the locked position into the release position when the locking hook is being displaced.

In the locking device according to the invention, since the guiding track is formed on an insert, the path traveled by the locking hook upon actuation of the driving motor can be easily adjusted to the requirements existing in the specific application by selecting an insert that has a suitable guiding track. Thus, a modular system can be provided in which only the insert has to be adjusted to the requirements while the other components of the locking device can stay the same.

Preferably, the insert of the locking device according to the invention is inserted into a corresponding recess of the locking support. In order for the insert to take up a defined installation position, it is secured against being moved in the moving direction of the slide by stops in a preferred embodiment of the locking device.

In a specific embodiment of the locking device according to the invention, at least one of the stops is formed by an outer step of the insert. In the installation position, the step is in contact with a counterpart, such as a front end of a rib of the locking support, for example. Another stop can be formed by a front end of the insert, said front end being in contact with a wall of the locking support.

In order to be able to retain the insert in the locking support, the insert preferably has restraining means that retain it in the locking support. For example, each restraining means is formed by a spring element that is formed integrally on an upper boundary surface or on a lower boundary surface of the insert. In particular, the spring element is in contact with a rib or a web of the locking support, the insert thus being restrained.

Advantageously, the insert is an exchangeable plastic injection-molded part. All elements, such as the stops and the restraining means, can thus be formed in one piece with the insert.

SUMMARY

In a preferred embodiment of the locking device according to the invention, the locking hook is mounted on the slide via a journal. In this way, a multi joint arrangement guiding the displacing movement of the locking hook is realized by means of the slide, the pull-link arrangement and the locking hook.

The journal via which the locking hook is mounted on the slide can engage into an oblong hole. The oblong hole is advantageously formed on the locking hook. Of course, it is also contemplated for the journal to be fixed to the locking hook and for the oblong hole to be formed on the slide. The pivot axis of the locking hook travels in the oblong hole during displacement of the locking hook.

Alternatively, instead of the oblong-hole/journal connection, an additional link could be provided between the slide and the locking hook.

In an embodiment of the locking device according to the invention that is simple to implement in terms of construction, the pull-link arrangement is composed of one link or of a pair of links which is/are mounted on the locking hook via a first hinge point and on the slide via a second hinge point. The pull-link arrangement thus consists of a single intermediate lever or of a pair of intermediate levers which is/are arranged between the locking hook and the slide.

In order to also be able to retain the locking hook in the locking support in particular without rattling, the locking hook is preferably pre-loaded in the direction of its locked position by means of a retaining spring.

In a special embodiment of the locking device according to the invention, the retaining spring acts on the end of the pull-link arrangement that is associated with the locking hook.

A driving wheel which drives the slide can be connected to the slide in particular via a driving link arrangement. The driving link arrangement can be formed in the manner of a crank drive in conjunction with the driving wheel and can comprise a coupling link which is hinged to the driving wheel at one side and to the slide at the other side. The driving wheel being driven rotationally causes a translational shift of the slide in or on the locking support.

The driving wheel can have a stop which interacts with end stops of the locking support. The end stops define the release position and the locked position of the locking hook.

The invention also relates to a top of a convertible vehicle comprising a locking device of the kind mentioned above, by means of which the top or a top element can be fixed to a front cowl of the vehicle. A locking counterpart is arranged on the front cowl, said locking counterpart interacting with the hook end or gripping end of the locking hook to fix the top or the top element. The locking counterpart is a bolt, for example, behind which the locking hook can engage.

Other advantages and advantageous embodiments of the subject-matter of the invention are apparent from the description, the drawing and the claims.

An embodiment of a top having a locking device according to the invention is illustrated in the drawing in a schematically simplified manner and is explained in more detail in the following description.

BRIEF DESCRIPTIONS OF THE DRAWINGS

DETAILED DESCRIPTION

Figure 1:
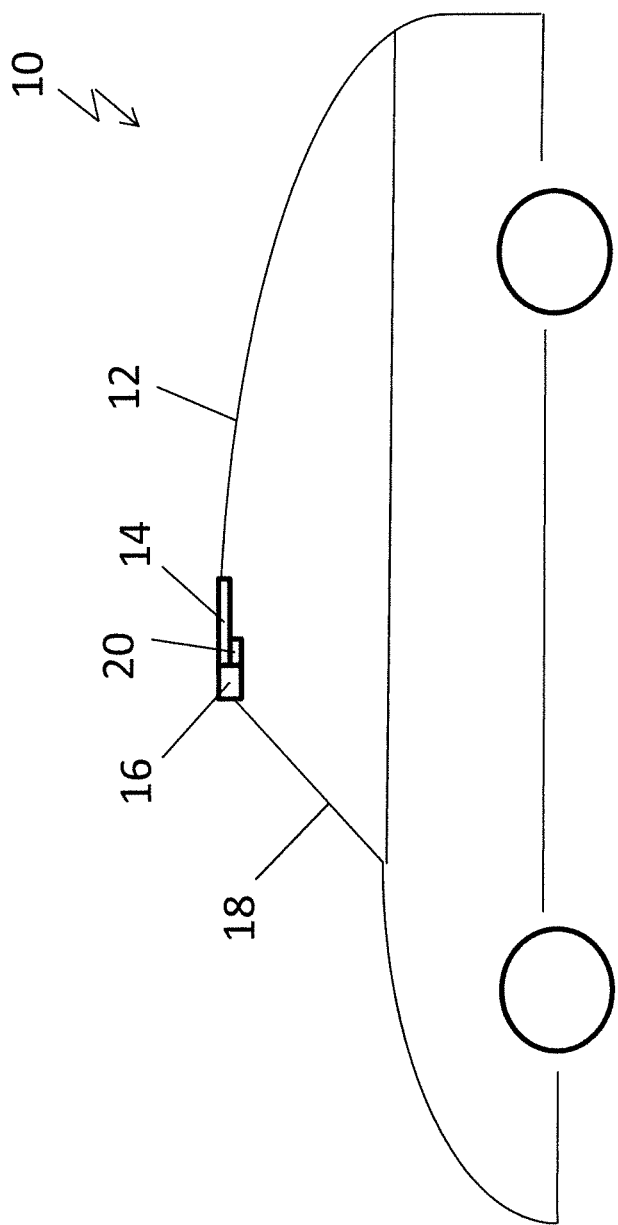
FIG. 1 shows a schematic side view of a convertible vehicle having a top which is fixed to a front cowl by means of a locking device.
Figure 2:
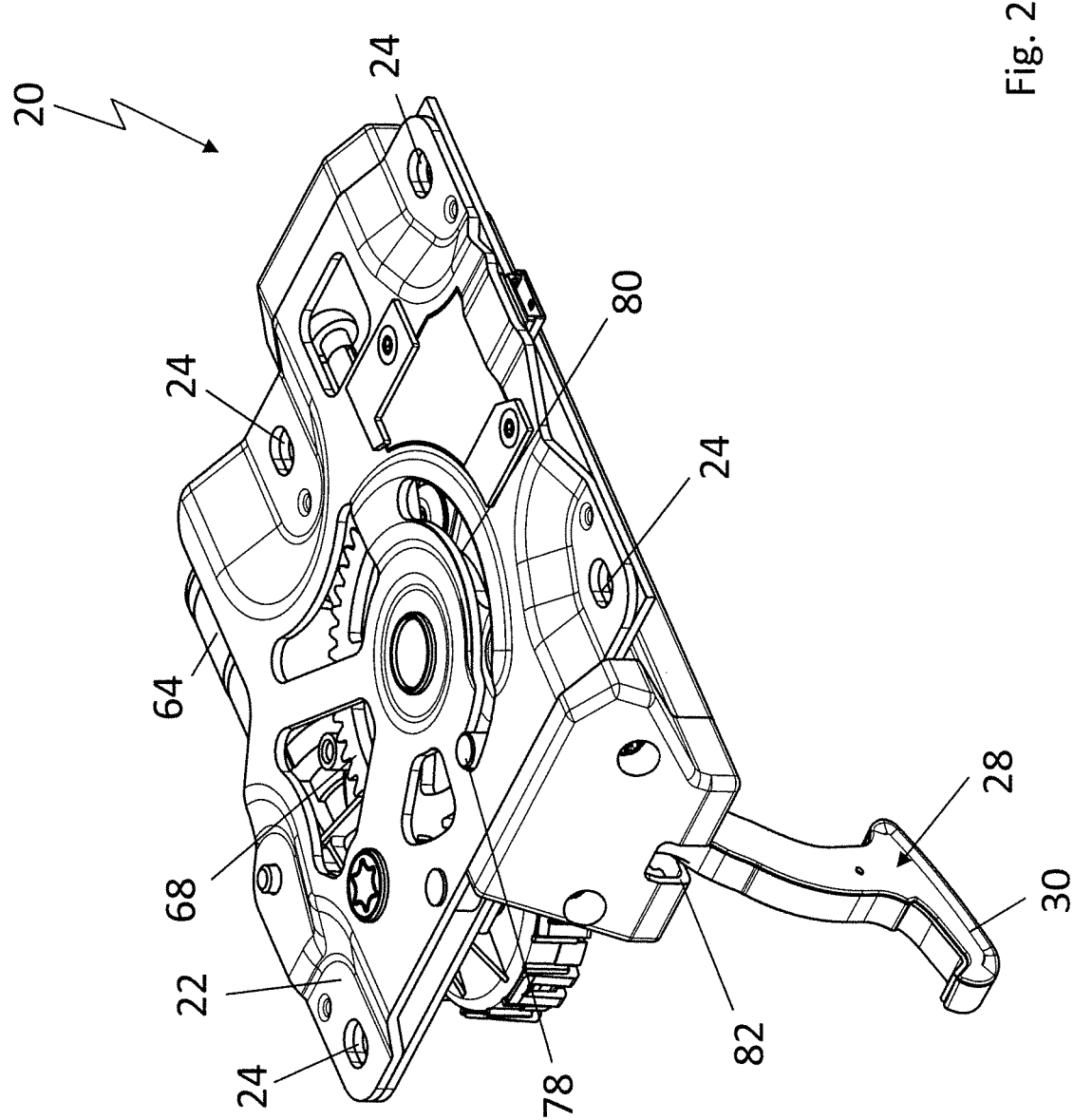
FIG. 2 shows a perspective top view of the locking device when in its release position.
Figure 3:
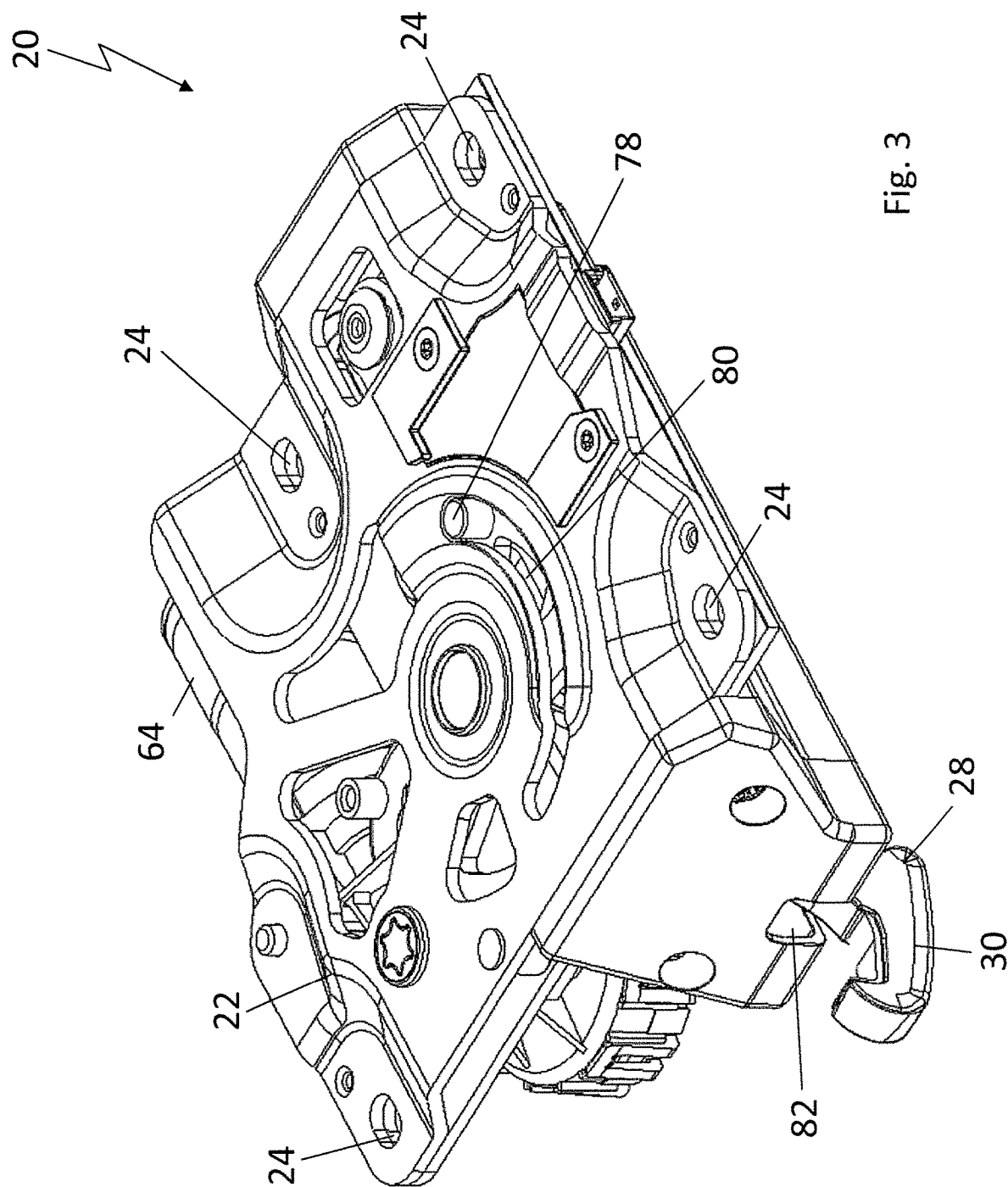
FIG. 3 shows a perspective top view of the locking device when in its locked position.
Figure 4:
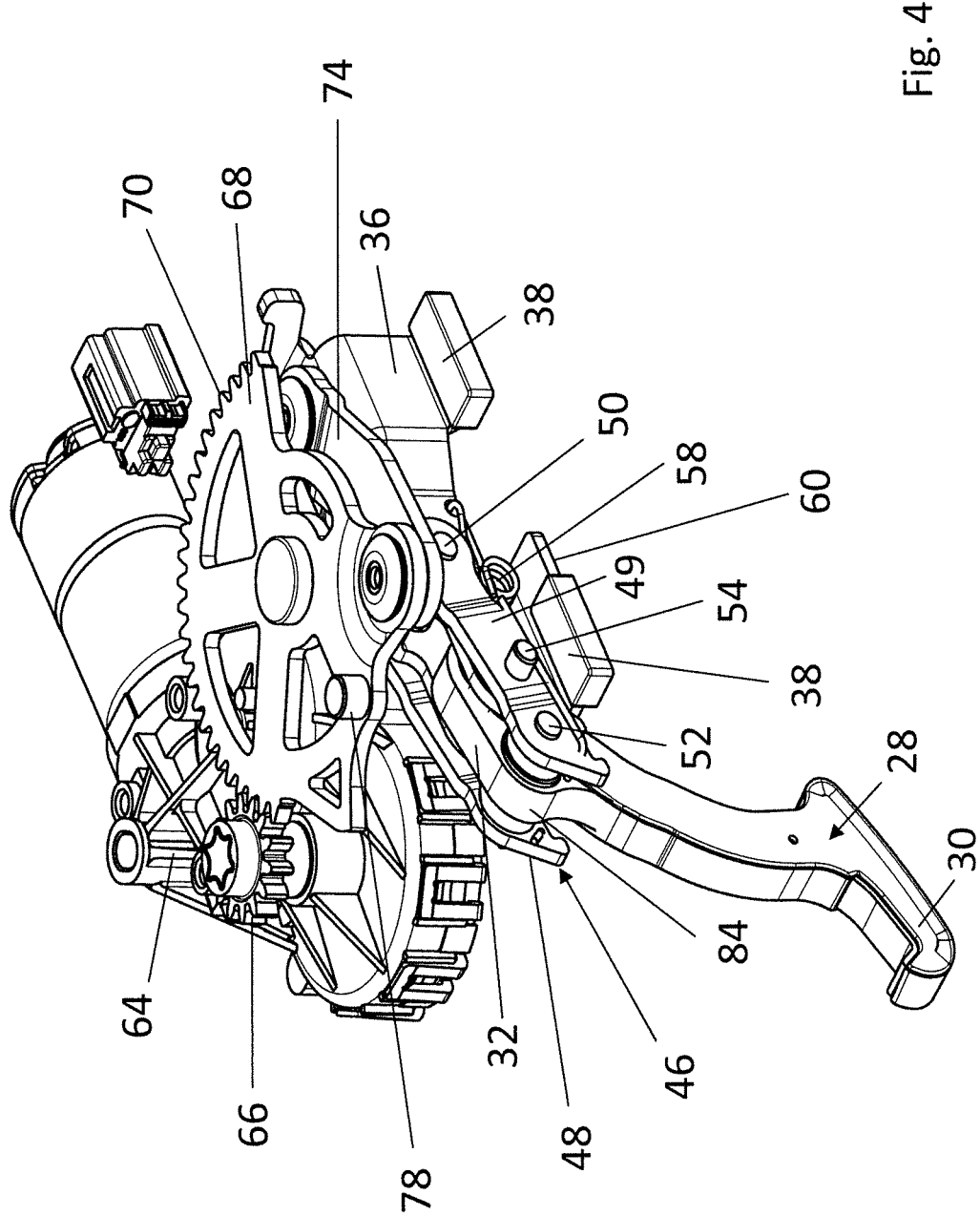
FIG. 4 shows an illustration of the locking device when in its release position corresponding to FIG. 2, but shown without a locking support.
Figure 5:
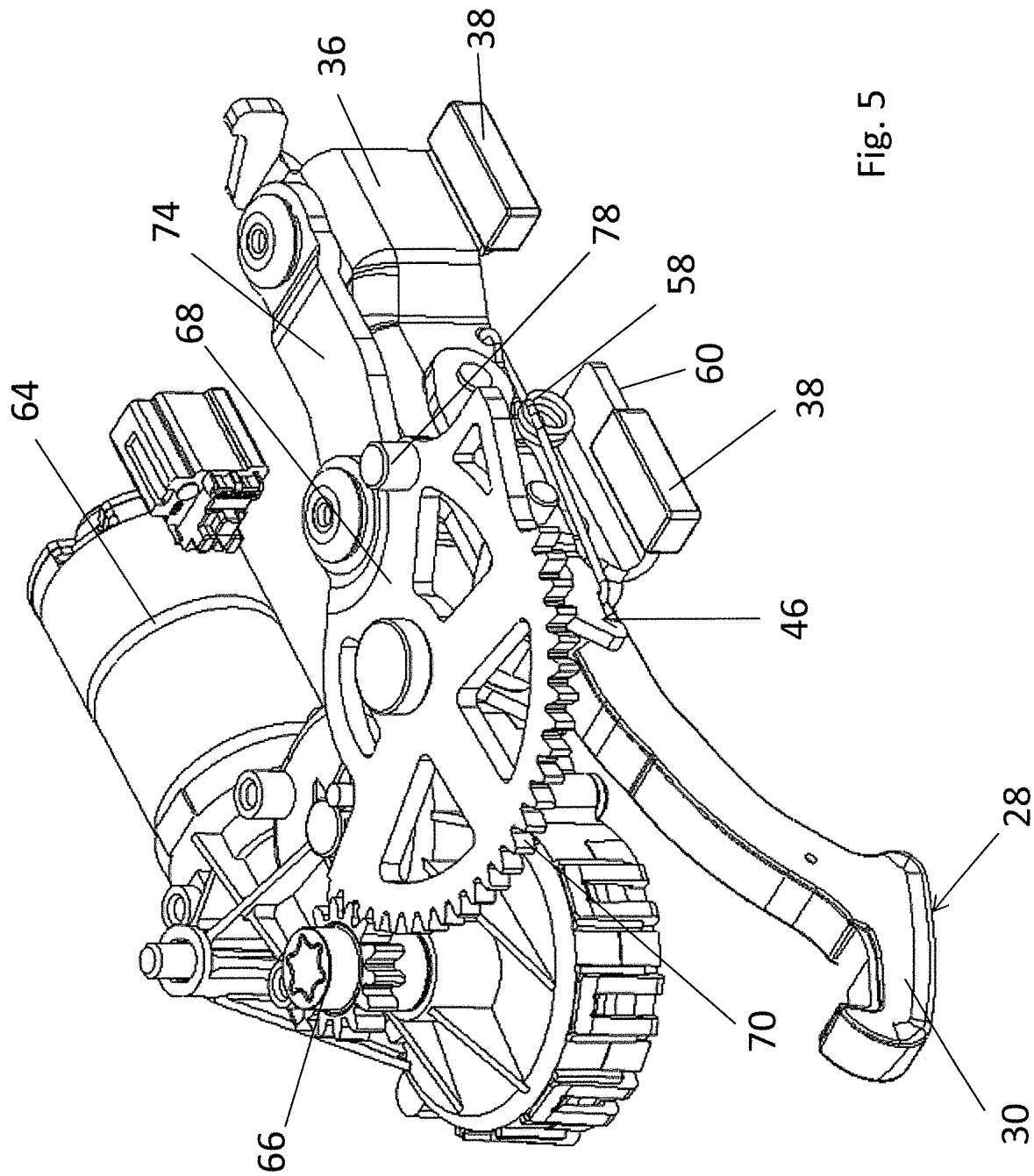
FIG. 5 shows an illustration of the locking device corresponding to FIG. 3, but in its locked position and shown without the locking support.
Figure 6:
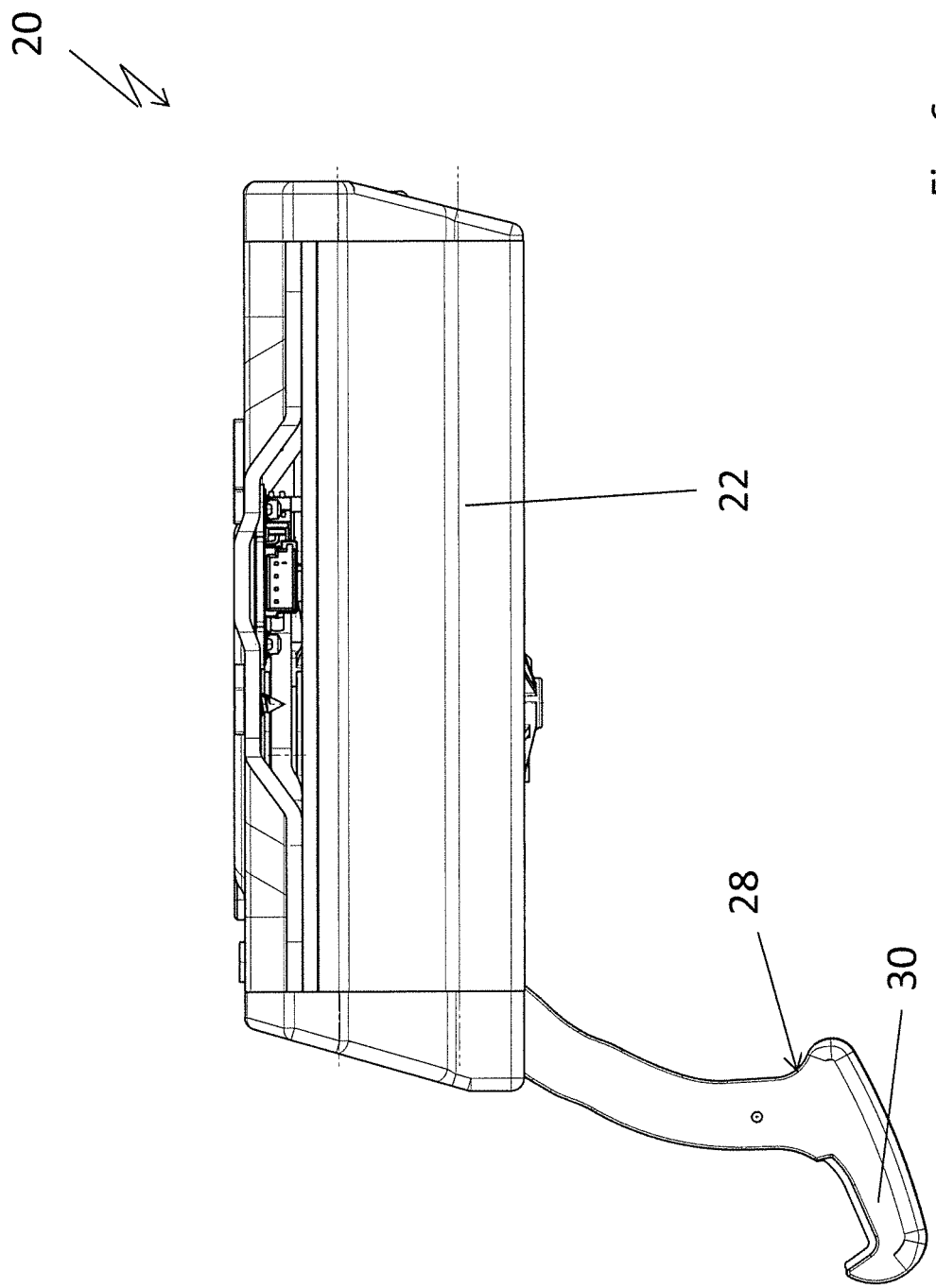
FIG. 6 shows a side view of the locking device when in its release position.

In FIG. 1, a convertible vehicle 10 is illustrated, which has a folding top 12, which can be displaced between a closed position, in which the vehicle interior is covered, and a storage position, in which the vehicle interior is open toward the top. In the closed position illustrated in FIG. 1, a front bow 14 of the folding top 12 is fixed to a front cowl 16 of the vehicle 10, said front cowl 16 being an upper frame part of a frame of a windshield 18, said frame part extending in the transverse direction of the vehicle 10.

The closed position of the folding top 12 is secured by means of a locking device 20, which is arranged at the underside of the front bow 14 and which is illustrated on its own in FIGS. 2 to 17. In the secured position, the locking device 20 takes up its locked position, whereas the locking device 20 is brought or displaced into its release position in order to displace the folding top 12.

The locking device 20 comprises a locking support 22, which has screw holes 24 for being fixed to the front bow and to which the other components of the locking device 20 are mounted or attached and which accommodates them at least in part. The locking support 22, which has a lid and a bottom, thus forms a casing of the locking device 20.

Figure 7:
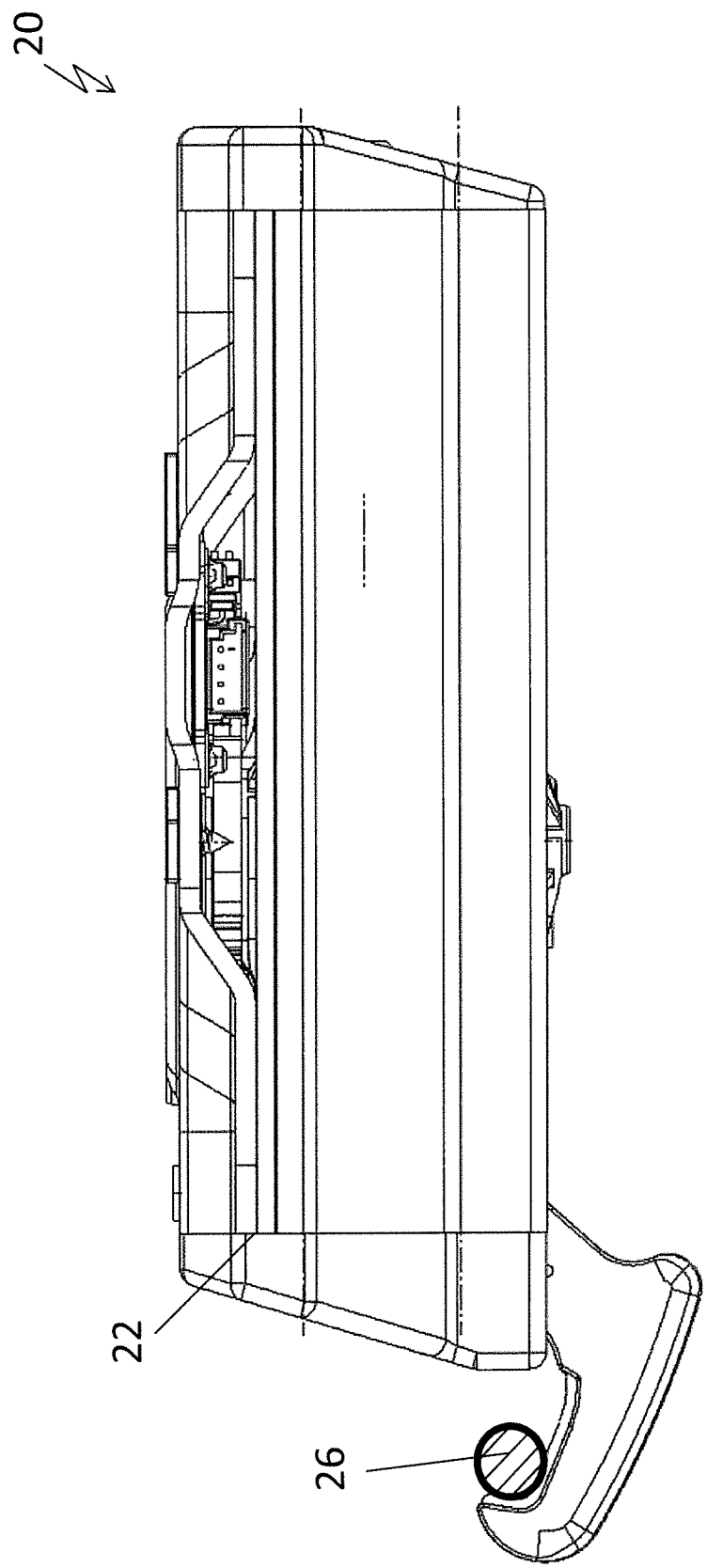
FIG. 7 shows a side view of the locking device when in its locked position corresponding to FIG. 6.
Figure 8:
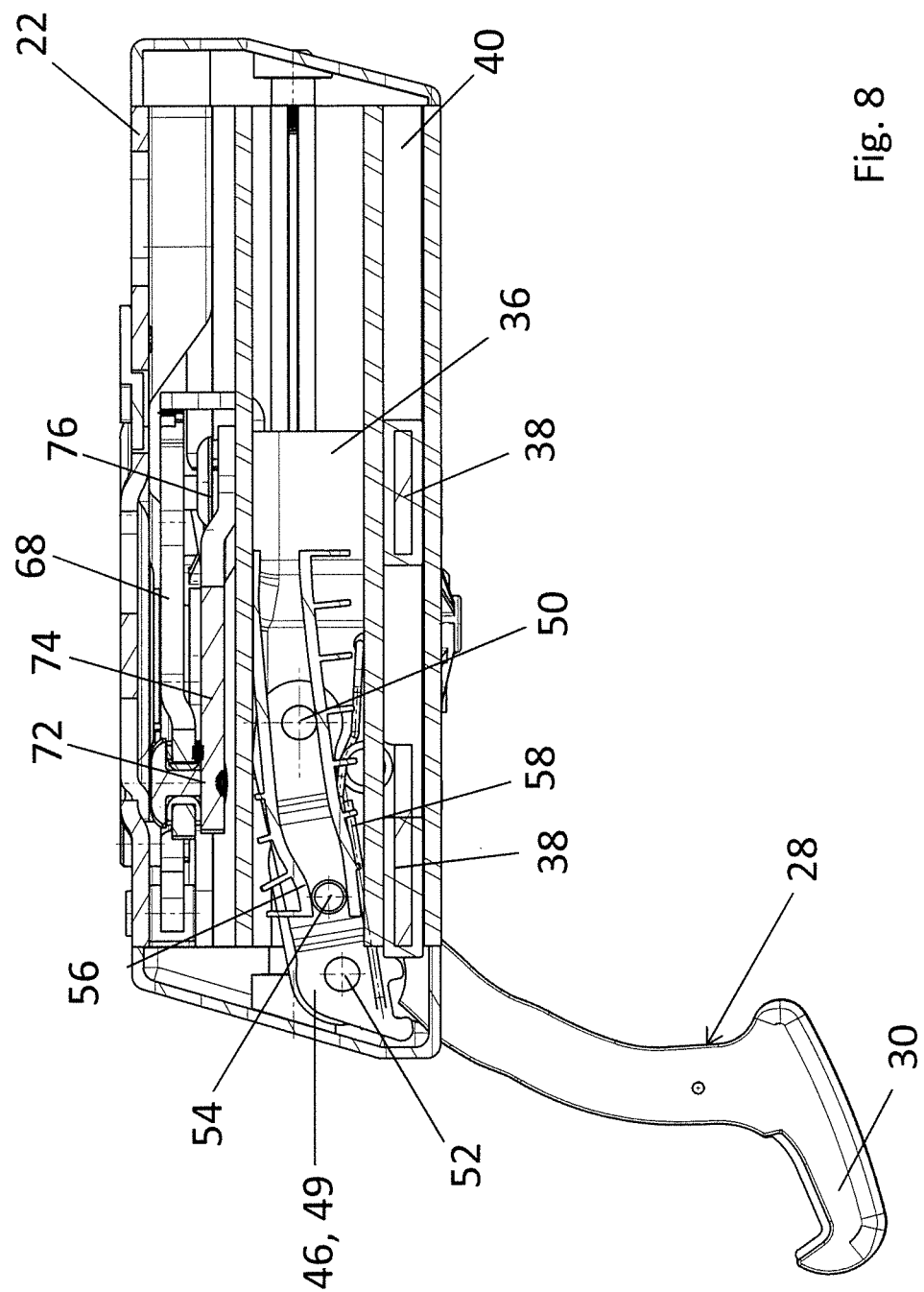
FIG. 8 shows a longitudinal cross-section of the locking device along line VIII-VIII in FIG. 19 when in its release position.
Figure 9:
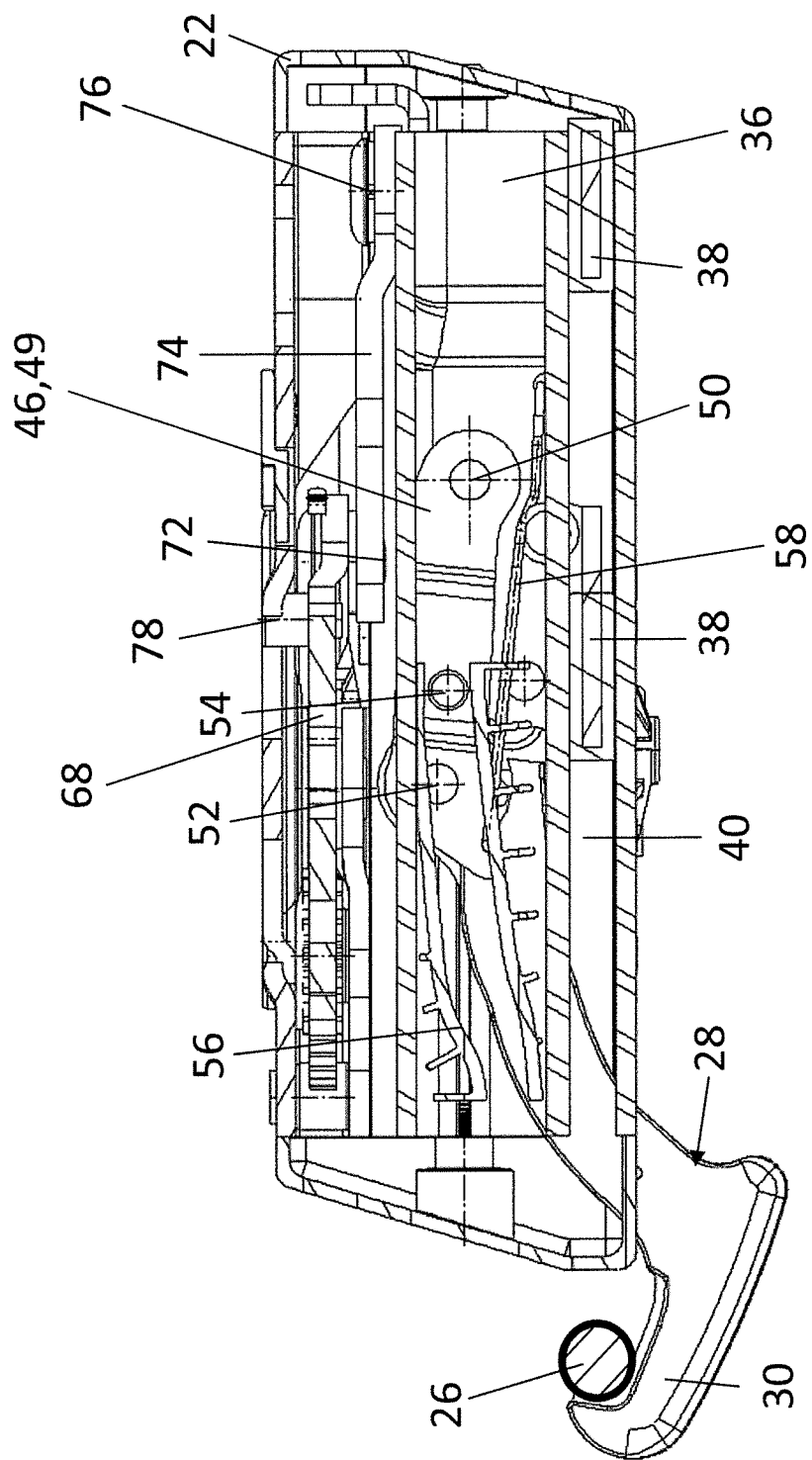
FIG. 9 shows a longitudinal cross-section corresponding to FIG. 8 through the locking device along line IX-IX in FIG. 20, but in its locked position.
Figure 10:
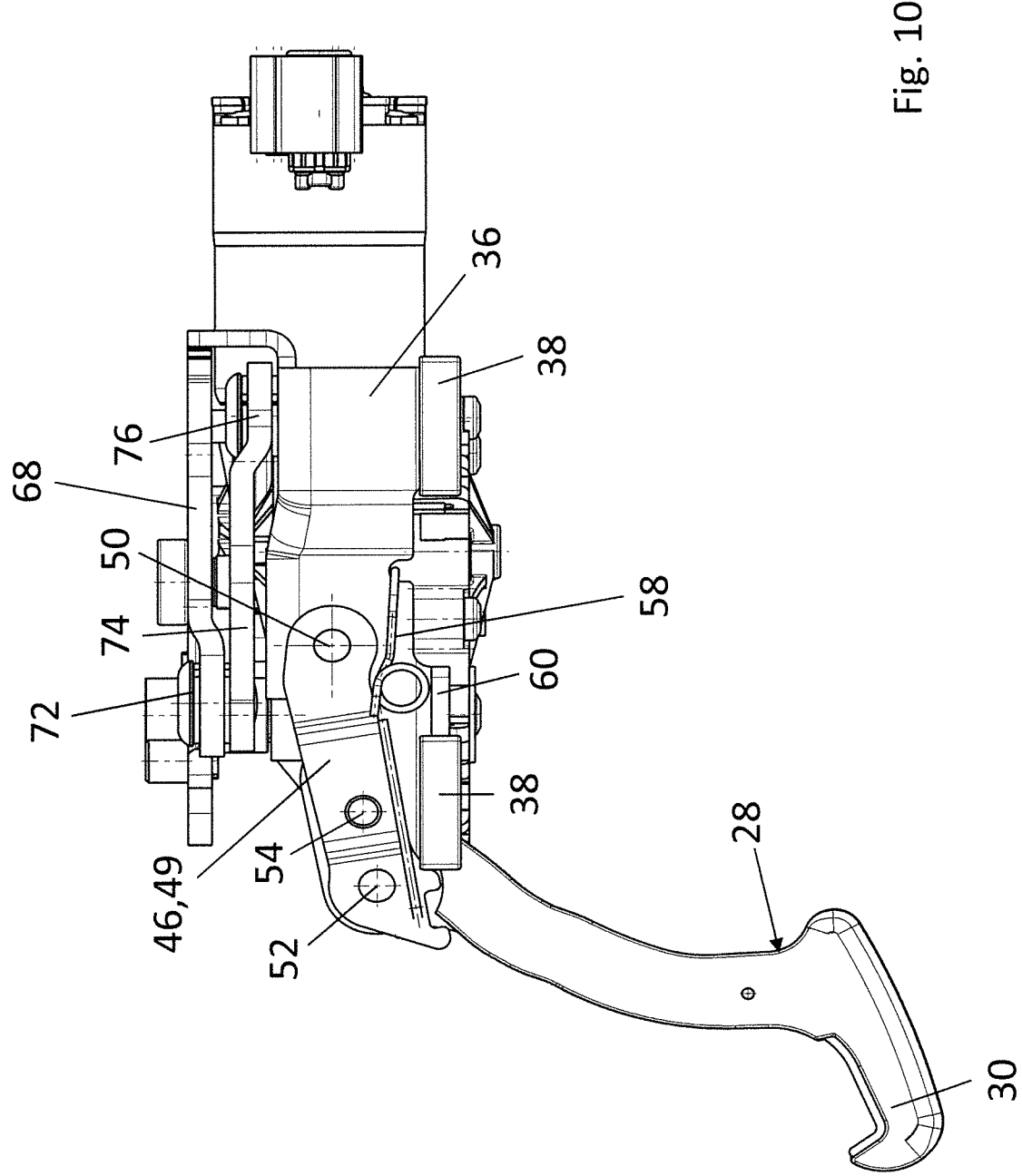
FIG. 10 shows a side view of the locking device when in its release position, but shown without the locking support.
Figure 11:
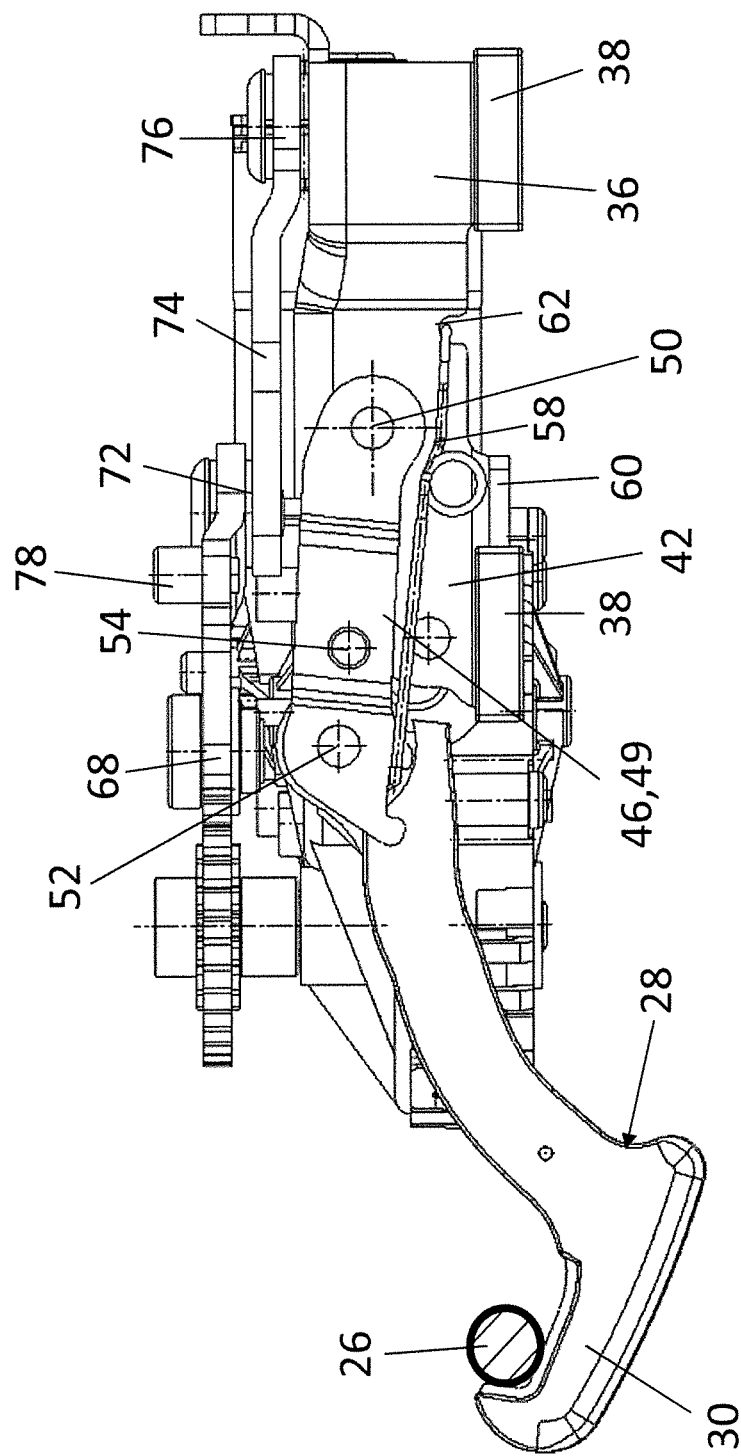
FIG. 11 shows a side view of the locking device corresponding to FIG. 10, but in its locked position.
Figure 12:
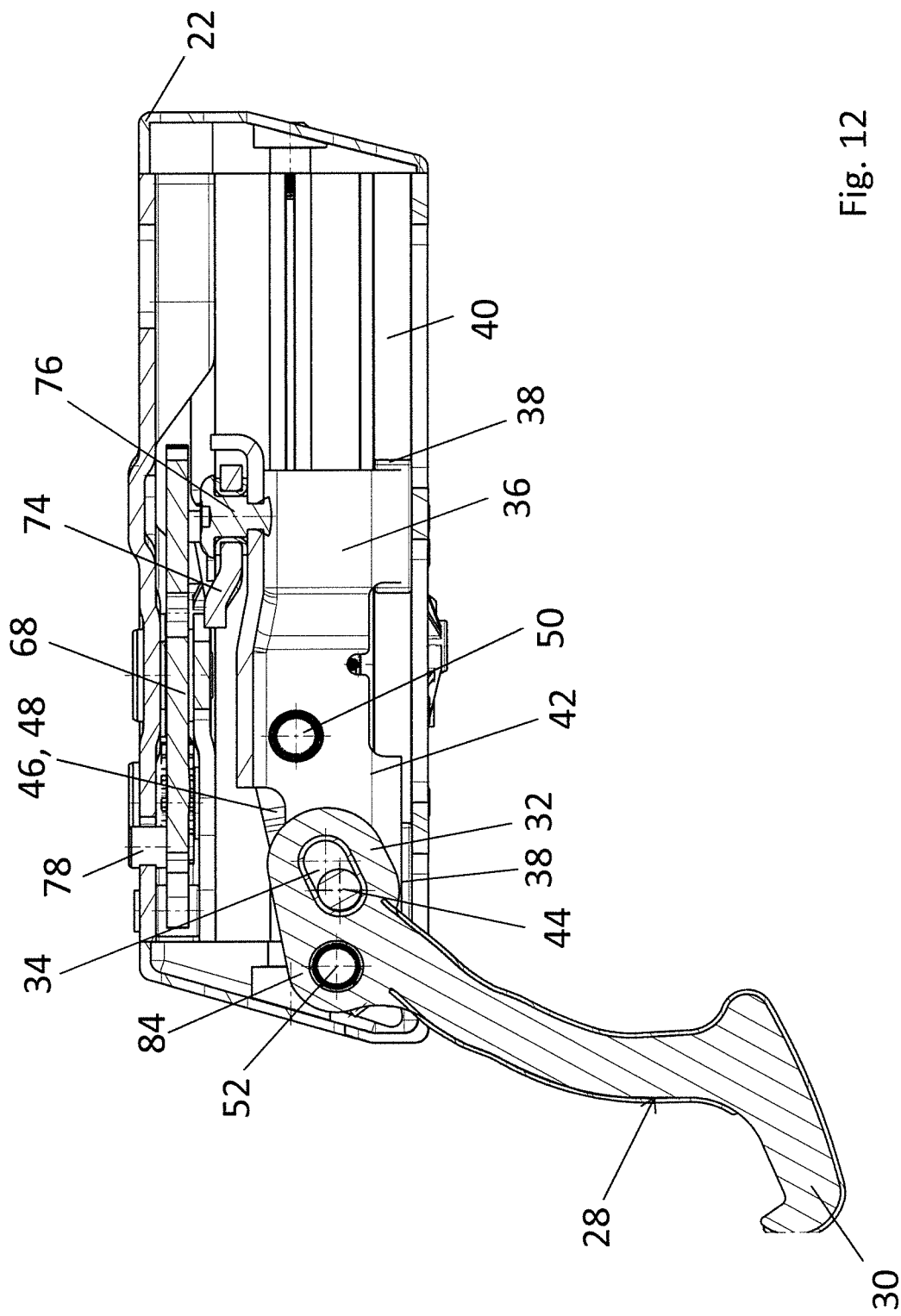
FIG. 12 shows another longitudinal cross-section through the locking device along line XII-XII in FIG. 19 when in its release position.
Figure 13:
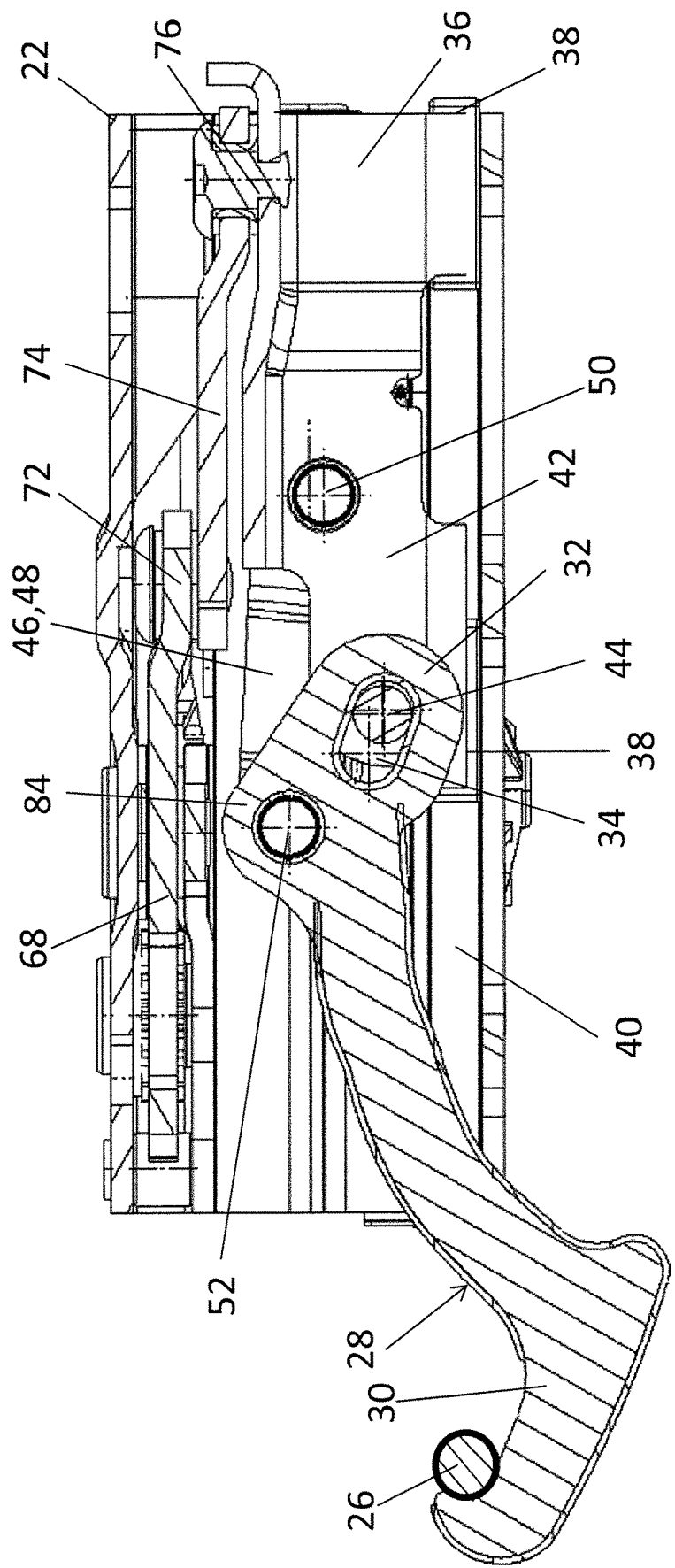
FIG. 13 shows a longitudinal cross-section corresponding to FIG. 12 along line XIII-XIII in FIG. 20 when in its locked position.

The locking device 20 comprises a locking hook 28 to become engaged with a locking bolt 26, which is arranged on the front cowl 16 of the vehicle structure and which is illustrated in FIGS. 7, 9 and 11. The locking hook 28 has a front hook section 30, which engages behind the locking bolt 26 of the front cowl 16 when in the locked position, and a rear bearing section 32, in which an oblong hole 34 is formed (cf. FIGS. 12 and 13).

For being driven, the locking hook 28 is connected to a slide 36, which has two sliding feet 38 on each of its two sides with respect to the vertical longitudinal center plane of the locking hook, said sliding feet 38 being guided in a guiding track 40 of the locking support 22.

The slide 36 has two lateral flanks 42, between which the rear bearing section 32 of the locking hook 28 is arranged and which are connected to each other via a journal 44 that penetrates the oblong hole 34 of the locking hook 28.

Between the slide 36 and the locking hook 28, a pull-link arrangement 46 is arranged, which is composed of two pull links 48 and 49, between which a front end of the slide 36 and the rear bearing section 32 and a driving section 84 of the locking hook 28 are arranged. The pull links 48 are each hinged to the slide 36 via a rear hinge point 50, which is formed by a bolt penetrating the slide 36. At their front ends, the pull links 48 are hinged to the driving section 84 of the locking hook 28 via a hinge point 52 defined by a journal.

Figure 14:
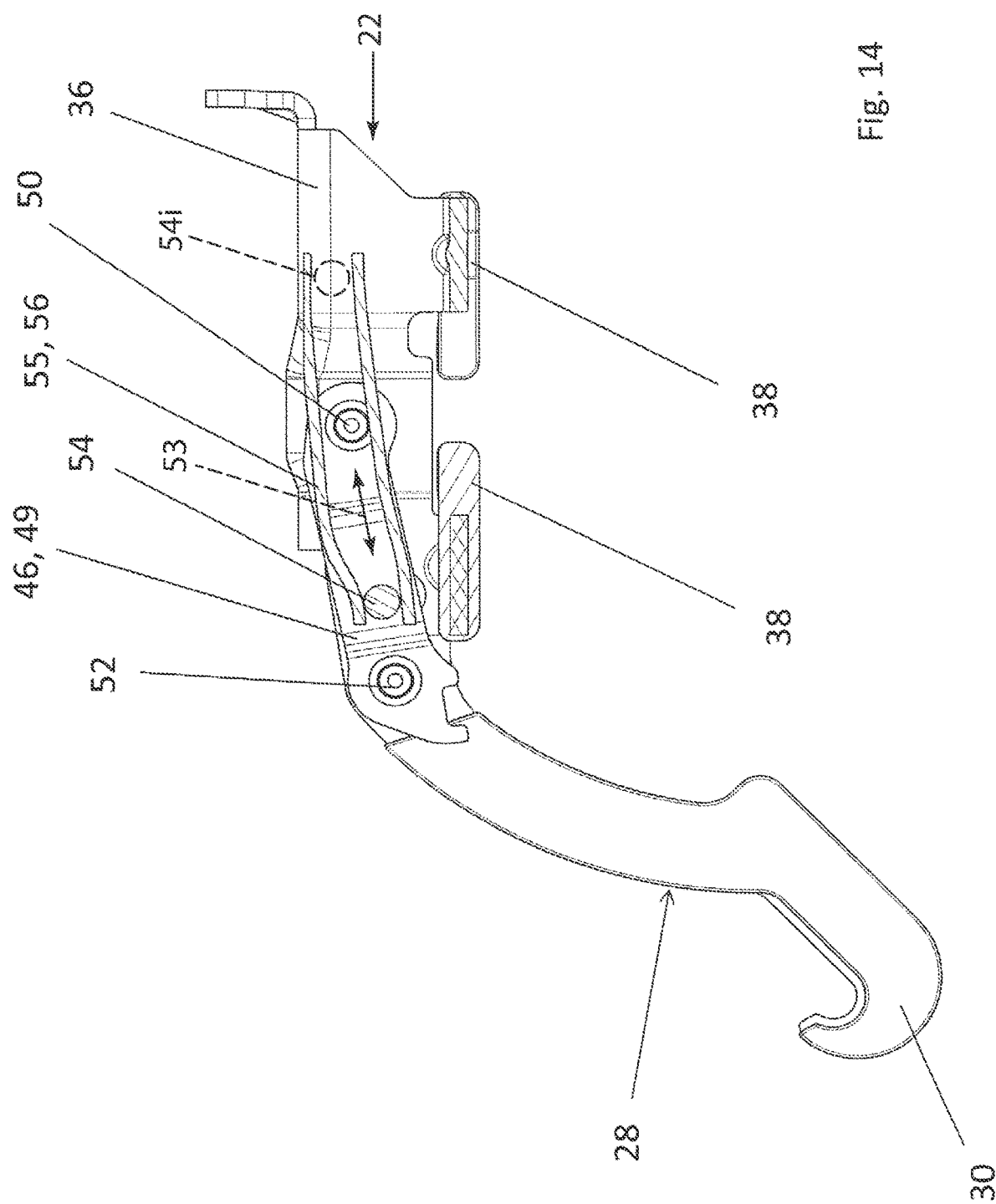
FIG. 14 shows a side view of a locking hook, of a pull-link arrangement and of a slide as well as of a guiding track for the pull-link arrangement of the locking device when in its release position, but without showing the locking support.
Figure 15:
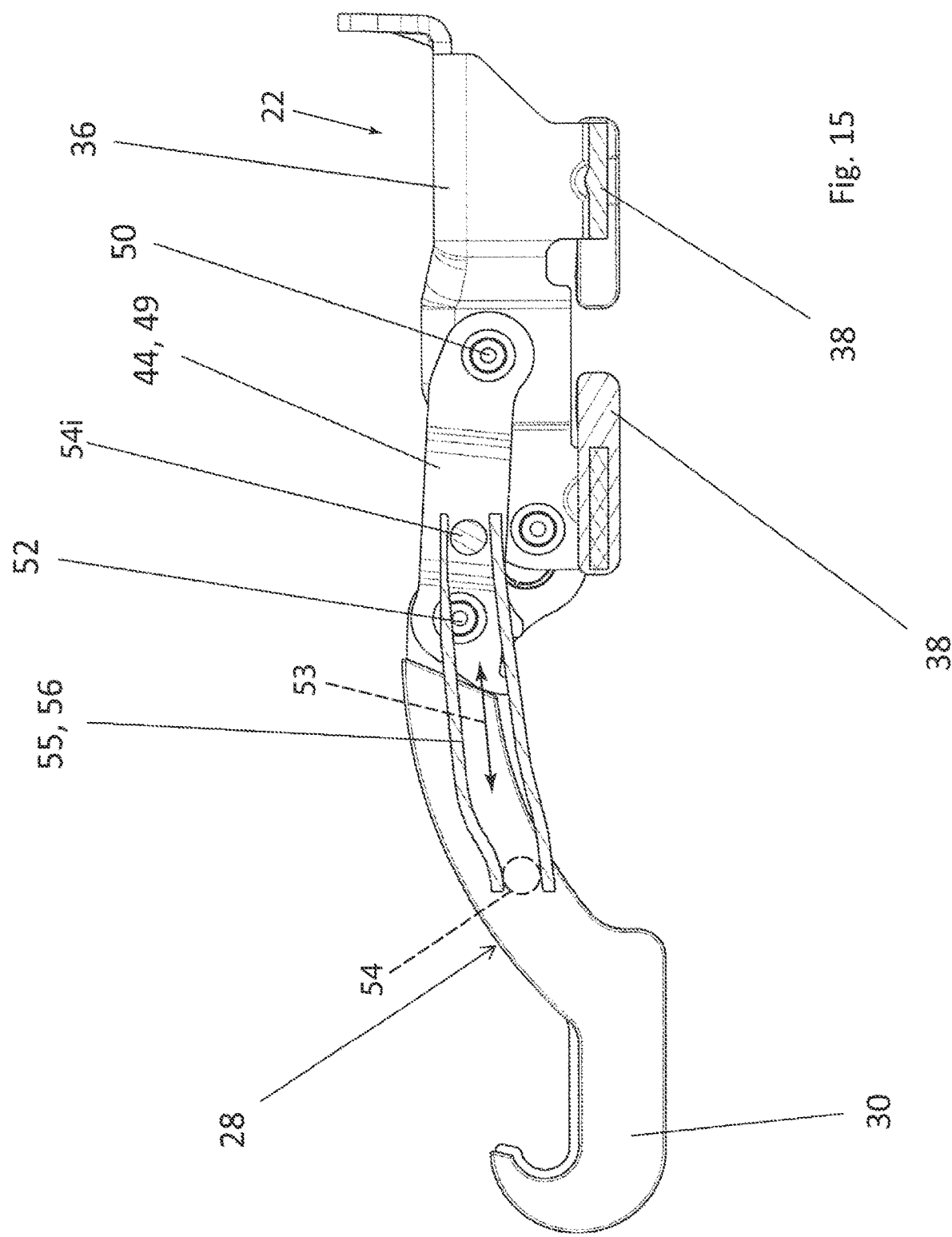
FIG. 15 shows a side view corresponding to FIG. 14, but in the locked position of the locking device.
Figure 16:
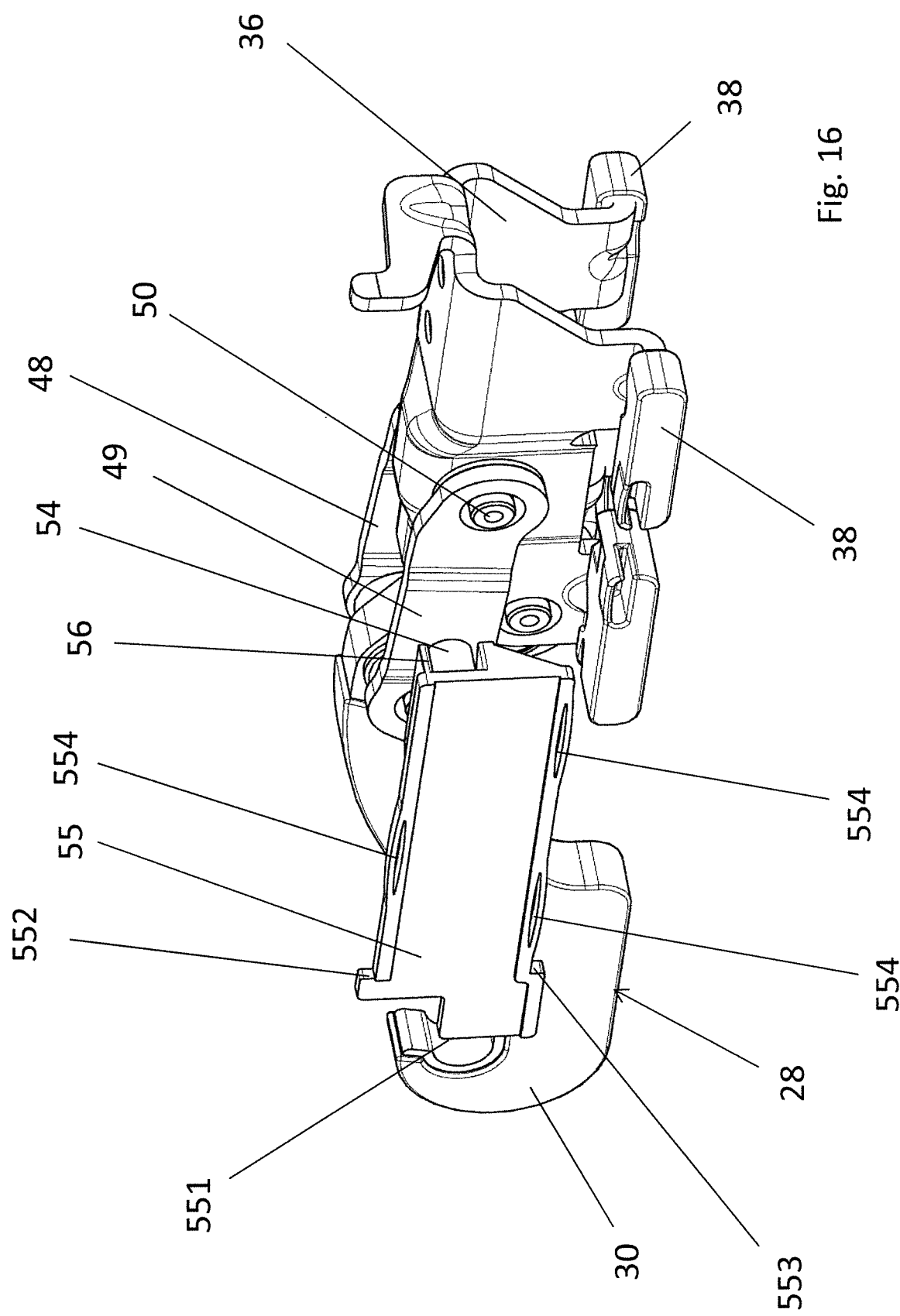
FIG. 16 shows a perspective rear view of the locking hook, of the pull-link arrangement, of the slide and of an insert on which the guiding track is formed.
Figure 17:
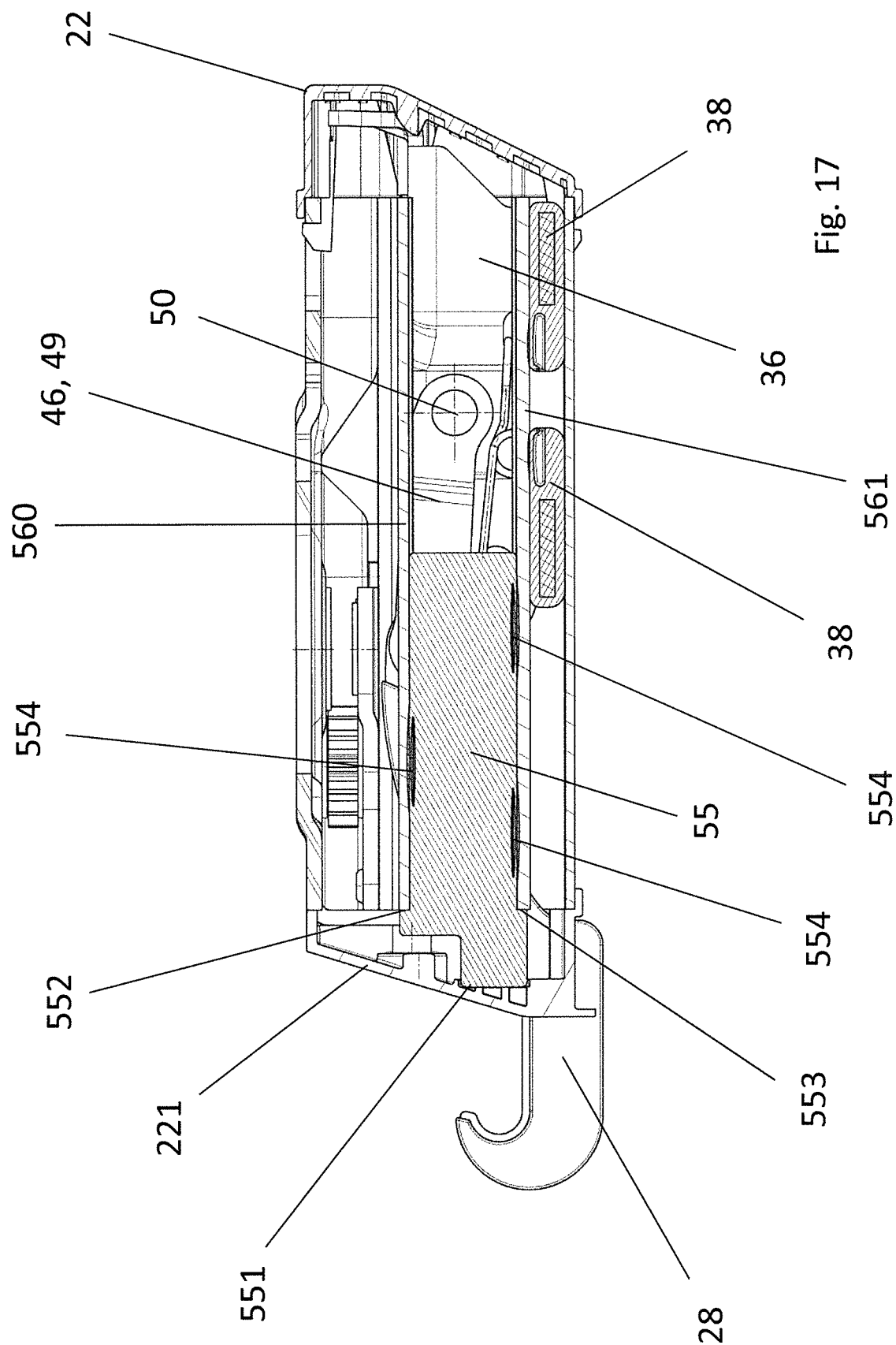
FIG. 17 shows a longitudinal cross-section through the locking device along line XVII-XVII in FIG. 19.
Figure 18:
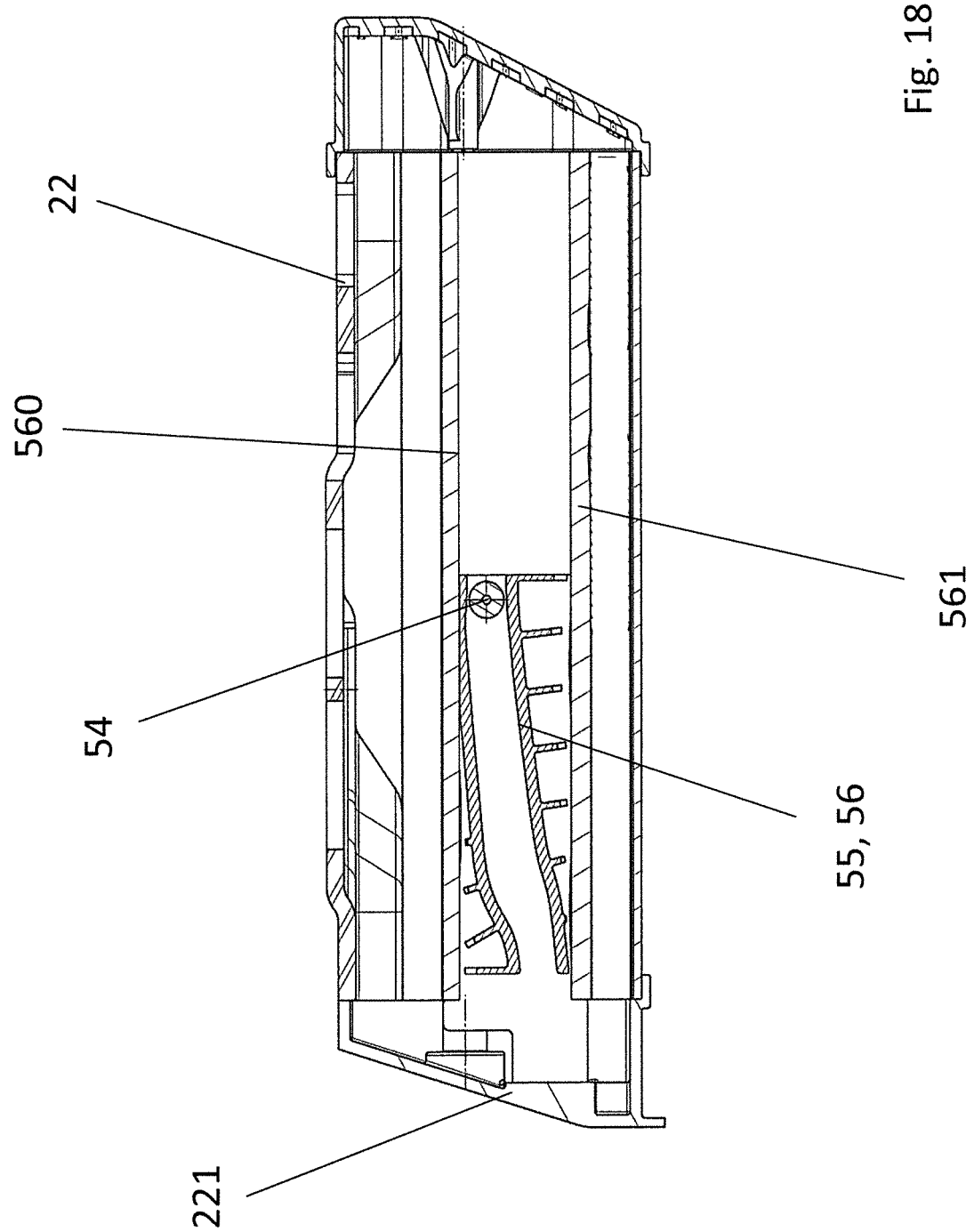
FIG. 18 shows a longitudinal cross section through the locking device corresponding to FIG. 8, but without showing any kinematic elements.

At its outer side, the pull link 49 carries a journal-like guiding element 54, which is guided in a guiding track or slotted track 56, which is arranged on the inner side of the locking support 22 and is arranged on an insert 55 of the locking support 22. The insert 55 is exchangeable, allowing the guiding track 56 to be adjusted to different top systems in a modular manner. It defines upper and lower moving-curve limits. In other words, locking support 22, as shown in part in FIGS. 14 and 15, has a slotted/guiding track 56 which limits and defines the travel path and position of guiding element 54 (54i) along its travel 53 between a released position of the locking hook 28 (FIG. 14), to a locked position (FIG. 15). Note that 54i shows a superimposed representation of element 54 at its opposing extent of travel along the travel path 53. Thus, as shown in FIGS. 14 and 15, the pivot position of locking hook 28, shown at hinge point 52, is also defined by the position of guiding element 54 within the travel path 53 of guiding track 56.

The insert 55, which has ribs limiting the guiding track 56, has a stop 552 and a stop 553 at its upper side and on its underside, respectively, each stop being formed by a step and being in contact with a front end of a respective guiding rib 560 and 561, respectively. The insert 55 is accommodated between the two guiding ribs 560 and 561. Additionally, a front end of the insert 55 forms another stop 551, which is in contact with an outer wall 221 of the locking support 22 when in the installation position. The stops 551, 552 and 553 secure the insert 55 against being moved in a moving direction of the slide 36.

Furthermore, a restraining means 554 is formed on the upper side of the insert 55 and two restraining means 554 are formed on the underside of the insert 55. Each restraining means 554 forms a spring element, which is a leaf spring and bears against the respective guiding rib 560, 561 of the locking support 22, thus keeping the insert 55 in position and restraining it between the guiding ribs 560 and 561. The insert 55 is a plastic injection-molded part and defines the path traveled by the locking hook 28 during movement of the slide 36 by the configuration of the guiding track 56 formed on the insert 55.

In order to pre-load the locking hook 28 in the direction of its locked position, the locking device 20 has a leg spring 58, which rests on a protrusion 60 formed on the slide 36 and one leg of which engages into a groove 62 of the slide 36 and a second leg of which is in contact with the pull link 48 at the front-side end roughly below the hinge point 52 and pushes the pull link 48 upward.

At the underside of the casing-like locking support 22, which is composed of multiple parts, a driving motor 64 is arranged, which drives a driving pinion 66. The driving pinion 66 is engaged with a driving wheel 68, which can rotate about an axis A and which has a toothing 70 across an angle of about 120° to 160°, which is engaged with the toothing of the driving pinion 66. The driving wheel 68 has a connecting eye 72, via which a coupling link 74 is hinged thereto, the end of the coupling link 74 that faces away from the driving wheel 68 being hinged to the upper side of the slide 36 via a joint 76.

On its upper side, the driving wheel 68 carries a stop journal 78, which is guided in a slotted track 80 when the driving wheel rotates about axis A, said slotted track 80 running concentrically with respect to axis A and being formed on the casing, i.e. on the locking support 22. The edges of the slotted track 80 in the circumferential direction each form a counterstop for the stop journal 78, defining the release position of the locking hook 28 (cf. FIG. 19) on the one hand and the closed position of the locking hook 28 (cf. FIG. 20) on the other hand.

The locking device 20 described above is actuated in the manner described below.

Figure 19:
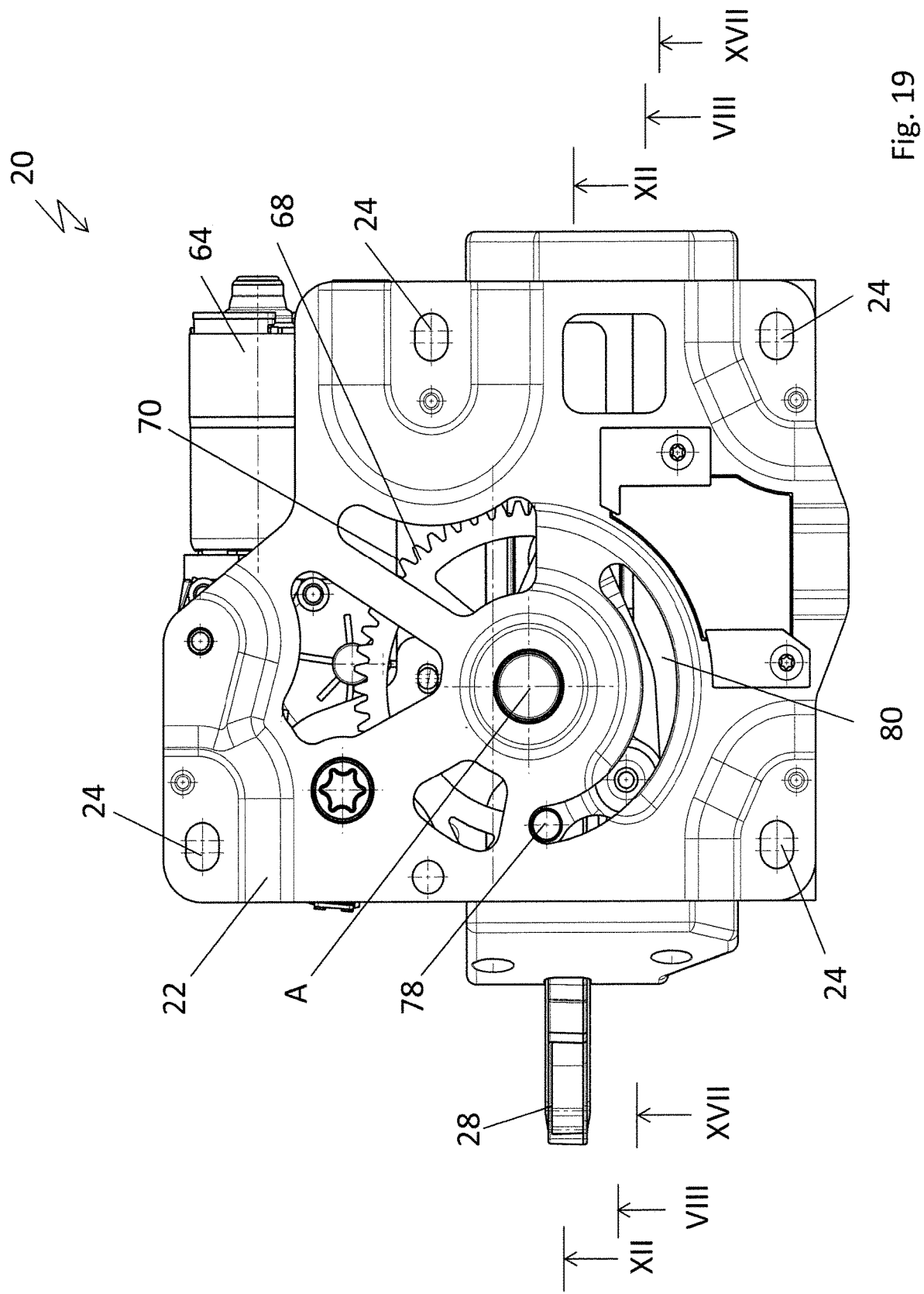
FIG. 19 shows a top view of the locking device when in its release position.
Figure 20:
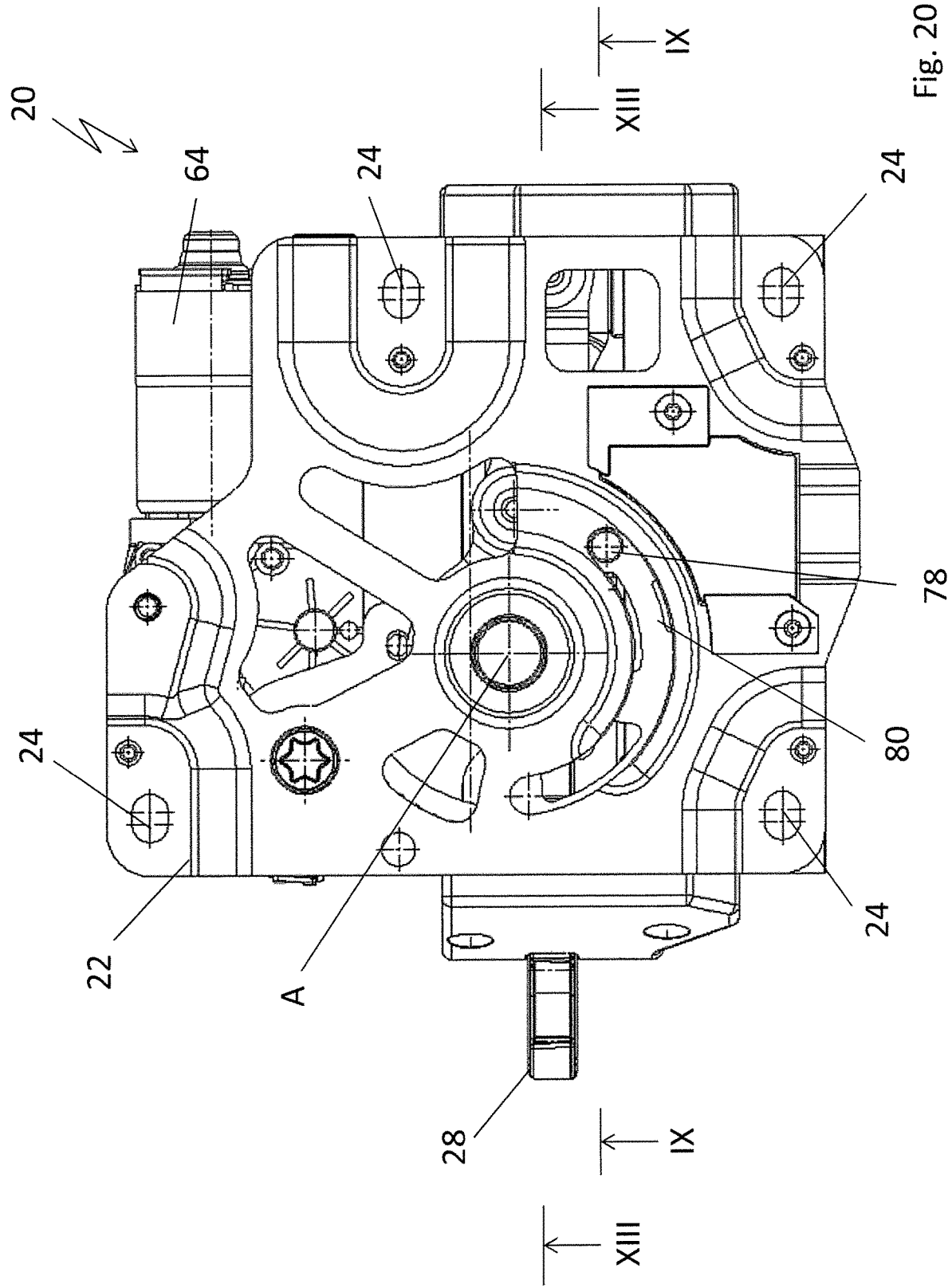
FIG. 20 shows a view corresponding to FIG. 19, but in the locked position of the locking device.
Figure 21:
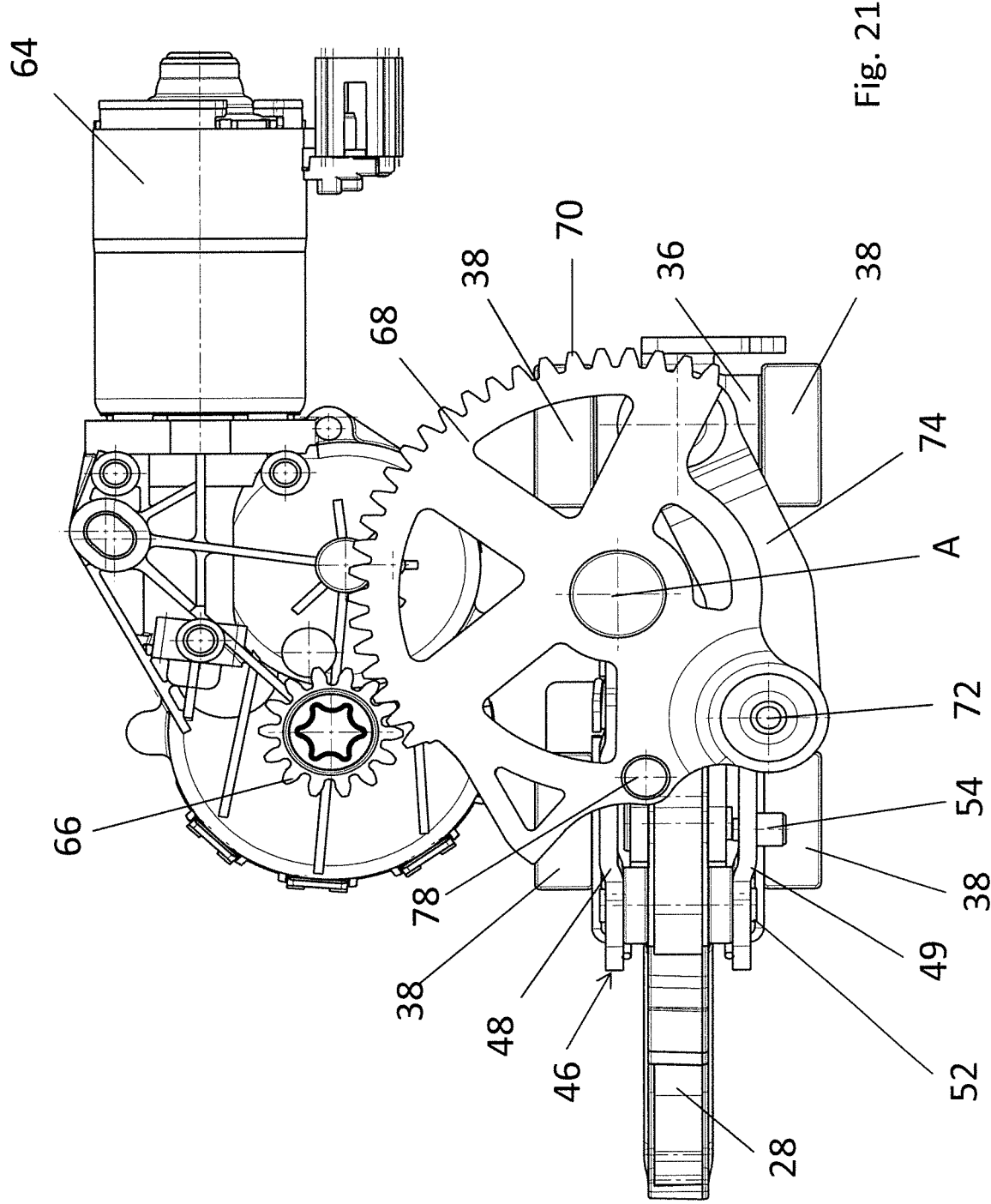
FIG. 21 shows a top view of the locking device when in its release position, shown without the locking support.
Figure 22:
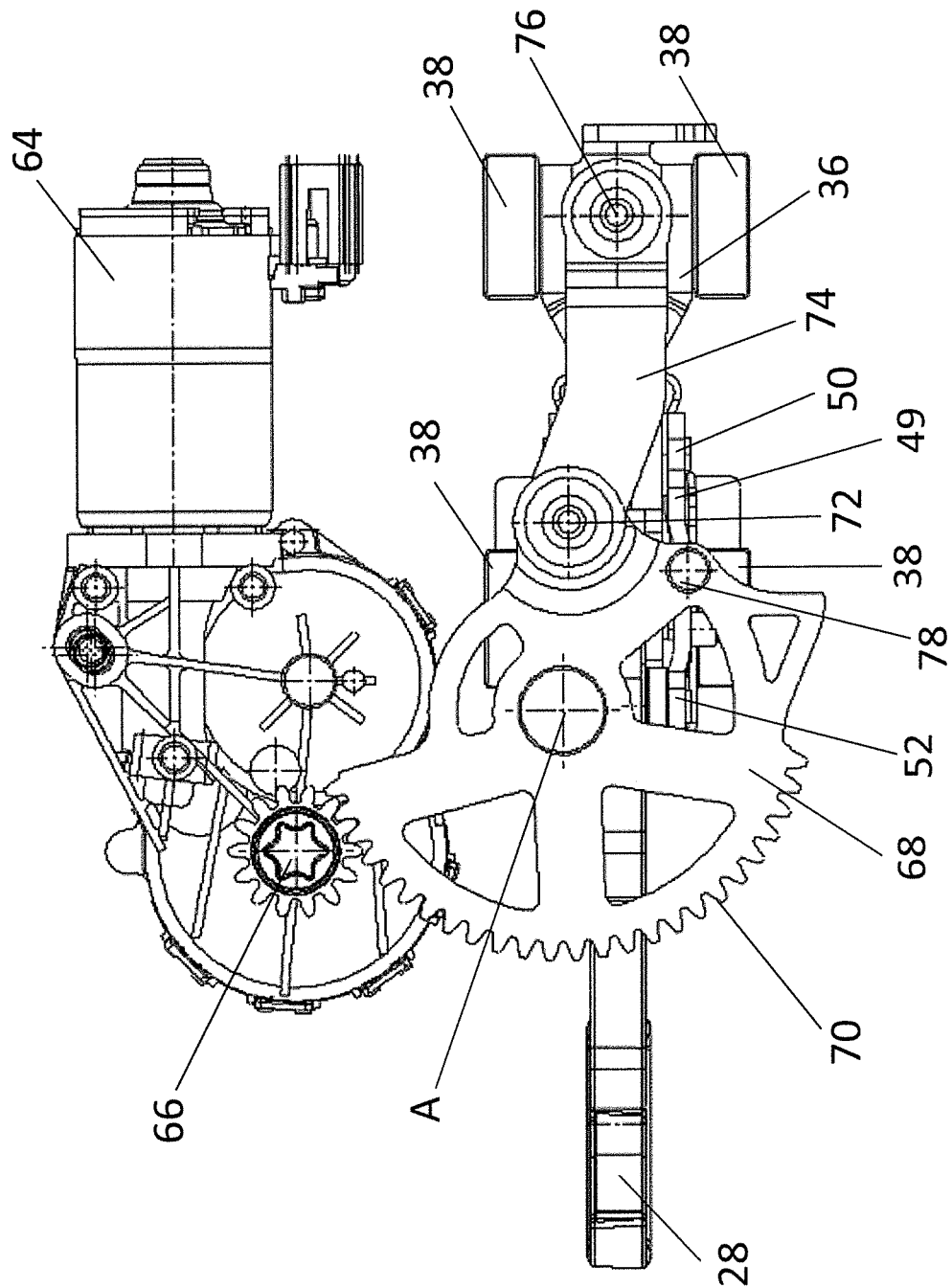
FIG. 22 shows a view of the locking device corresponding to FIG. 21, but in its locked position.

Starting from the release position of the locking device 20 as illustrated in FIG. 19, for example, the driving motor 64 is actuated in such a manner that the driving wheel 68 is rotated counterclockwise about axis A with respect to the orientation illustrated in FIGS. 19 to 22. In this way, the driving wheel 68 exerts thrust on the slide 36 via the coupling link 74, a pulling force thus being exerted on the locking hook 28 via the pull links 48. The locking hook 28 is thus pulled into the locking support 22 through a front-side and bottom-side slot 82, while at the same time being pivoted clockwise with respect to the orientation illustrated in FIGS. 6 to 13, namely about a pivot axis that travels with the journal 44 in the oblong hole. The pivoting movement is caused by the pulling force exerted by the pull links 48 on the driving section 84 of the locking hook 28, in which the hinge point 52 is formed and which is offset from a connecting line between the bearing section 32 and the hook section 30 of the locking hook 28. Additionally, the pivoting movement is controlled by the guiding element 54, which is guided in the guiding track 56.

When adjusting the locking hook, the hook section 30 engages into a recess formed on the front cowl 16, a counterforce thus acting on the front bow 14 upon contact with the locking bolt 26, said counterforce pulling the front bow 14 downward. This is helpful since external forces usually push the front bow 14 to take up a higher position than that of the nominal position. This pushing action can be caused by the tension of a top cover or by a negative pressure occurring when the top is being closed during normal driving.

REFERENCE SIGNS 10 convertible vehicle
12 folding top
14 front bow
16 front cowl 18 windshield
20 locking device
22 locking support
24 screw holes
26 locking bolt
28 locking hook
30 front hook section
32 rear bearing section
34 oblong hole
36 slide
38 sliding foot
40 guiding track
42 flank
44 journal
46 pull-link arrangement
48 pull link
49 pull link
50 hinge point
52 hinge point
54 guiding element
55 insert
56 guiding track
58 leg spring
60 protrusion
62 groove
64 driving motor
66 driving pinion
68 driving wheel
70 toothing
72 connecting eye
74 coupling link
76 joint
78 stop journal
80 slotted track
82 slot
84 driving section
221 outer wall
551 stop
552 stop
553 stop
554 restraining means
560 guiding ribs
561 guiding ribs

The invention claimed is:

1. A locking device for use with a top of a convertible vehicle, the locking device comprising:
a locking support,
a locking hook, wherein the locking hook can be shifted in a translational and rotational manner relative to the locking support so as to be displaced between a release position and a locked position by a driving mechanism for the locking hook, the driving mechanism comprising a driving motor and driving a slide movable on the locking support,
wherein the slide is connected to a driving section of the locking hook via a pull-link arrangement in such a manner that the locking hook undergoes a pivoting movement when the slide is moved,
wherein the locking support has an insert having a guiding track for a guiding element which is arranged on the pull-link arrangement or on the locking hook, and
wherein the guiding track is configured such that it defines a travel path of the guiding element within the guiding track and the guiding track is configured such that it defines a pivot position of the pivoting movement of the locking hook with respect to the locking support, wherein the pivot position of locking hook is defined by the position of the guiding element within the travel path of guiding track.

2. The locking device according to claim 1, wherein the insert is secured against being moved in a moving direction of the slide by a plurality of stops; and
wherein at least one of the plurality of stops is formed by an outer step of the insert.

3. The locking device according to claim 1, wherein the insert comprises restraining means that retain it inside the locking support.

4. A locking device for use with a top of a convertible vehicle, the locking device comprising:
a locking support,
a locking hook, wherein the locking hook can be shifted in a translational and rotational manner relative to the locking support so as to be displaced between a release position and a locked position by a driving mechanism for the locking hook, the driving mechanism comprising a driving motor and driving a slide movable on the locking support,
wherein the slide is connected to a driving section of the locking hook via a pull-link arrangement in such a manner that the locking hook undergoes a pivoting movement when the slide is moved, and
wherein the locking support has an insert having a guiding track for a guiding element which is arranged on the pull-link arrangement or on the locking hook,
wherein the guiding track is configured such that it defines a travel path of the guiding element within guiding track and the guiding track is configured such that it defines a pivot position of the pivoting movement of the locking hook with respect to the locking support, wherein the pivot position of locking hook is defined by the position of the guiding element within the travel path of guiding track,
wherein the insert comprises restraining means that retain it inside the locking support, and
wherein each restraining means is formed by a spring element that is formed integrally on an upper boundary surface or on a lower boundary surface of the insert.

5. The locking device according to claim 1, wherein the insert is an exchangeable plastic injection-molded part.

6. The locking device according to claim 1, wherein the locking hook is mounted on the slide via a journal.

7. The locking device according to claim 6, wherein the journal engages into an oblong hole.

8. The locking device according to claim 1, wherein the pull-link arrangement is composed of at least one pull link, which is mounted on the locking hook via a first hinge point and on the slide via a second hinge point.

9. The locking device according to claim 1, wherein the locking hook is pre-loaded in the direction of its locked position by means of a retaining spring.

10. The locking device according to claim 9, wherein the retaining spring acts on an end of the pull-link arrangement that is associated with the locking hook.

11. The locking device according to claim 1, wherein a driving wheel is connected to the slide via a coupling-link arrangement.

12. The locking device according to claim 1, wherein a driving wheel has a stop which interacts with end stops of the locking support.

13. A top of a convertible vehicle, comprising a locking device according to claim 1 for fixing a top element to a front cowl of the vehicle.

14. A locking device for use with a top of a convertible vehicle, the locking device comprising:
- a locking support,
- a locking hook, wherein the locking hook can be shifted in a translational and rotational manner relative to the locking support so as to be displaced between a release position and a locked position by a driving mechanism for the locking hook, the driving mechanism comprising a driving motor and driving a slide movable on the locking support,
- wherein the slide is connected to a driving section of the locking hook via a pull-link arrangement in such a manner that the locking hook undergoes a pivoting movement when the slide is moved,
- wherein the locking support has an insert having a guiding track for a guiding element which is arranged on the pull-link arrangement or on the locking hook,
- wherein the guiding track is configured such that it defines a travel path of the guiding element within guiding track and the guiding track is configured such that it defines a pivot position of the pivoting movement of the locking hook with respect to the locking support, wherein the pivot position of locking hook is defined by the position of the guiding element within the travel path of guiding track,
- wherein the locking hook is hinged to the pull-link arrangement via a hinge point on one side, and to the driving slide via a journal/oblong-hole connection on its other side, and
- wherein the pull-link arrangement is hinged to the driving slide.

15. A locking device for use with a top of a convertible vehicle, the locking device comprising:
- a locking support,
- a locking hook, wherein the locking hook can be shifted in a translational and rotational manner relative to the locking support so as to be displaced between a release position and a locked position by a driving mechanism for the locking hook, the driving mechanism comprising a driving motor and driving a slide movable on the locking support,
- wherein the slide is connected to a driving section of the locking hook via a pull-link arrangement in such a manner that the locking hook undergoes a pivoting movement when the slide is moved,
- wherein the locking support has an insert having a guiding track for a guiding element which is arranged on the pull-link arrangement or on the locking hook,
- wherein the guiding track is configured such that it defines a travel path of the guiding element within guiding track and the guiding track is configured such that it defines a pivot position of the pivoting movement of the locking hook with respect to the locking support, wherein the pivot position of locking hook is defined by the position of the guiding element within the travel path of guiding track, wherein the guiding element is configured to be on an outer side of the pull-link arrangement, and
- wherein the guiding element has an axis configured to be parallel to a pivot axis of the locking hook on the pull-link arrangement.

* * * * *